UNITED STATES PATENT OFFICE.

ADA CORNING ATWATER, OF MANCHESTER, IOWA.

PROCESS OF TREATING ORES OF THE PRECIOUS METALS.

No. 817,411.     Specification of Letters Patent.     Patented April 10, 1906.

Application filed August 6, 1904. Serial No. 219,771.

*To all whom it may concern:*

Be it known that I, ADA CORNING ATWATER, a citizen of the United States, residing at Manchester, in the county of Delaware and State of Iowa, have invented certain new and useful Improvements in Processes of Treating Ores of the Precious Metals, of which the following is a specification.

My invention relates to a process of treating ores of the precious metals, it being adapted for all ores containing selenium and not confined to ores containing sulfids; and it consists in the admixture of granulated ore with a theoretical amount of granulated carbon or carbonaceous material determined by calculation, so as not to have an excess quantity, and subjecting the mixture first to a low degree of heat, which is gradually increased until it reaches a clear red, which heat is continued for a predetermined period of time until the refractory element has been eliminated by being volatilized or converted into vapor.

By way of explanation of the process the ores after being granulated are mixed with from, say, one (1) to ten (10) per cent. of granulated charcoal or equivalent carbonaceous material and are placed in a crucible, for instance, over which is placed an inverted crucible, through the bottom of which latter a small hole has been bored, said inverted crucible being sufficiently small to fit inside the crucible containing the mixture low enough down to permit of the connection being tightly luted with fire-clay to exclude air. The crucibles are then placed in a furnace, and commencing with a low degree of heat the latter is gradually increased to a clear red and continued at a steady heat—say from one to two hours. The crucible should be left in the furnace until the refractory element has been eliminated by being volatilized or converted into vapor, which will rise from the ores and escape through the opening in the inverted crucible. When the gases thus rising are no longer visible, the crucibles are removed from the furnace and are immediately made perfectly air-tight by stopping the aperture in the top or inverted crucible with fire-clay to exclude the oxygen, which would otherwise enter and counteract the results attained. They are then left in this condition until cold.

By experiment the exact amount of carbon for each ore can be determined, and this is of the utmost importance, because in my process I avoid the necessity of a second roast or any other oxidizing method of getting rid of excess of carbon, the ore being reduced and the precious metals left in a state in which they are readily recoverable by amalgamation, cyanidation, chlorination, or any other known method of separation.

In the operation of this process carbon or organic material yielding carbon by calcination may be employed in any form of furnace that can be readily constructed with a firebox surrounding the chamber containing the ore and having underneath an air-tight chamber into which the first charge may be drawn to cool while another charge is roasting, and it will be observed that my process can be applied to any ores containing refractory elements capable of being eliminated by the application of heat to convert such refractory elements into vapor or to cause their volatilization.

Having thus fully described my invention, what I claim as new, and desire to secure by Letters Patent, is—

1. The process of treating ores of the precious metals containing selenium consisting in mixing the ores with carbonaceous material and gradually heating the mixture to a low red heat while protected from air thereby driving off the selenium.

2. The process of treating ores of the precious metals containing selenium consisting in mixing the ores with a relatively small quantity of granulated carbonaceous material and subjecting the mixture to a low degree of heat while protected from air, which heat is gradually increased until it reaches a clear red.

3. The process of treating ores of the precious metals containing selenium consisting in first subjecting the ores to a low degree of heat in the presence of carbonaceous material while protected from air and gradually increasing the heat until it reaches a clear red thereby driving off the selenium.

4. The herein-described process for extracting metals from their respective ores containing selenium, by volatilization, consisting in mixing the ores in granulated form with a theoretical proportion of carbonaceous material, say from one (1) to ten (10) per cent., according to the nature of the ore being treated, heating the materials so mixed while protected from the air, to a temperature sufficient to volatilize the selenium, which may be present and eliminating it in the form of vapor, thereby separating such element from the precious metals, after which allowing it to cool while the air is still excluded.

In testimony whereof I have signed my name to this specification in the presence of two subscribing witnesses.

ADA CORNING ATWATER.

Witnesses:
I. J. NORRIS,
SAMUEL A. CARY.